United States Patent
Hsu et al.

(10) Patent No.: US 7,237,904 B2
(45) Date of Patent: Jul. 3, 2007

(54) CONTROL METHOD FOR COOLING A PROJECTION DISPLAY

(75) Inventors: Nien-Hui Hsu, Miao-Li County (TW); Shang-Hsuang Wu, Miao-Li County (TW); Chih-Neng Tseng, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 194 days.

(21) Appl. No.: 11/076,886

(22) Filed: Mar. 11, 2005

(65) Prior Publication Data

US 2005/0200814 A1    Sep. 15, 2005

(30) Foreign Application Priority Data

Mar. 12, 2004   (TW) ............................. 93106791 A

(51) Int. Cl.
*G03B 21/16* (2006.01)
(52) U.S. Cl. ..................... 353/52; 353/57; 348/748
(58) Field of Classification Search ............ 353/52, 353/57–61; 348/748, 794
See application file for complete search history.

(56) References Cited

U.S. PATENT DOCUMENTS

| | | | | |
|---|---|---|---|---|
| 6,322,218 | B1* | 11/2001 | Sugawara et al. | 353/52 |
| 6,702,444 | B2* | 3/2004 | Takizawa et al. | 353/52 |
| 2002/0118160 | A1* | 8/2002 | Nakamura et al. | 345/101 |

* cited by examiner

*Primary Examiner*—W. B. Perkey
*Assistant Examiner*—Andrew Sever
(74) *Attorney, Agent, or Firm*—MH2 Technology Law Group

(57) ABSTRACT

A control method for cooling a projection display, wherein a pressure sensor automatically detects the elevation above sea level of a projection display and then transmits a signal to the control unit for controlling the cooling unit to operate in a corresponding cooling mode, thereby the cooling efficiency varies with the elevation above sea level and then the cooling unit can operate in a corresponding rotating speed in order to effectively cool the whole projection display and increase the flexibility in using the projection display, and further extend the lifetime of each component inside the projection display.

4 Claims, 4 Drawing Sheets

CONTROL METHOD FOR COOLING A PROJECTION DISPLAY

FIELD OF THE INVENTION

The present invention relates to a projection display, and more particularly, to a control method for cooling a projection display.

BACKGROUND OF THE INVENTION

Please refer to FIG. 1. A conventional projection display 10 mainly includes a case 11, and a lamp 12, an optical engine 13, a control unit 14 and a set of fan 151 and fan 152 are disposed inside the case 11. Because the lamp 12, the optical engine 13, the control unit 14 generate heat, the set of fan 151 and fan 152 is needed for cooling so as to maintain the normal operation of the projection display 10.

However, the environment of the projection display 10 changes according to a user's need, such as: a high elevation above sea level or a low elevation above sea level. The heat conduction of the projection display 10 is according to the following formula:

$$Q=\rho*Cp*V*\Box T$$

wherein, Q is the total heat, $\rho$ is the density of the air, Cp is the specific heat of the air, V is the airflow rate of the fan and $\Box T$ is the temperature difference of the air flowing out of the projection display after being heated and the air flowing in the projection display. The number of $\rho$ decreases with the increasing of the elevation above sea level, thus, air of same volume can take away more heat on a high elevation above sea level than a low elevation above sea level. Consequently, the set of fan 151 and fan 151 that provides constant airflow cannot take away the heat inside the projection display completely, and then heat is accumulated in the projection display device 10 when at a high elevation above sea level, resulting the temperature of each component rises and each optical component in the projection display is damaged, and thereafter the lifetime of each component in the projection display is shortened. In addition, if the influence of the elevation above sea level is considered in the beginning of design, the noise will become louder and a user need to put up with a noisy operation environment even at a normally low elevation above sea level.

Hence, it is to be researched that how to make the projection display 10 have the best cooling efficiency in different operation environments.

SUMMARY OF THE INVENTION

One object of the present invention is to provide a control method for cooling a projection display, wherein a pressure sensor automatically detects the elevation above sea level of a projection display for controlling the cooling unit to operate at a corresponding rotating speed so as to provide the projection display a better cooling efficiency.

Another object of the present invention is to provide a control method for cooling a projection display, wherein the rotating speed of the cooling unit is adjusted simultaneously for extending the lifetime of the cooling unit and preventing noise.

Still another object of the present invention is to provide a control method for cooling a projection display, wherein a plurality of cooling modes is provided for increasing the flexibility in using the projection display.

For attaining the above objects, the present invention is a control method for cooling a projection display, wherein a pressure sensor automatically detects the elevation above sea level of a projection display and then transmits a signal to the control unit for controlling the cooling unit to operate in a corresponding cooling mode, thereby the cooling efficiency varies with the elevation above sea level and then the cooling unit can operate in a corresponding rotating speed in order to effectively cool the whole projection display and increase the flexibility in using the projection display, and further extend the lifetime of each component inside the projection display.

Further features and advantages of the present invention, as well as the structure and operation of the embodiments of the present invention, are described in detail below with reference to the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

A preferred embodiment of the present invention will be explained with reference to the accompanying drawings.

Figure 1:
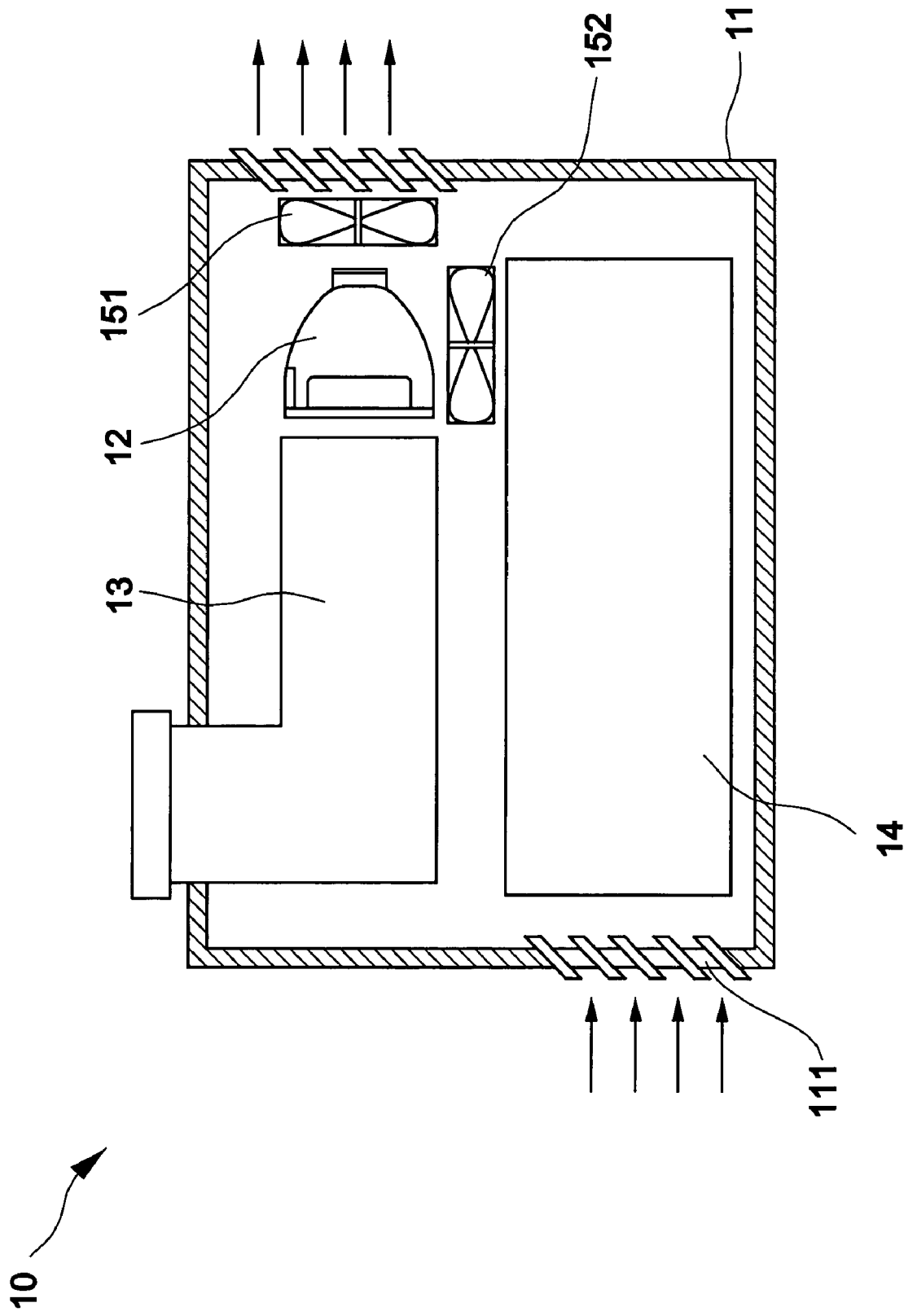
FIG. 1 is a perspective diagram showing a conventional projection display.
Figure 2:
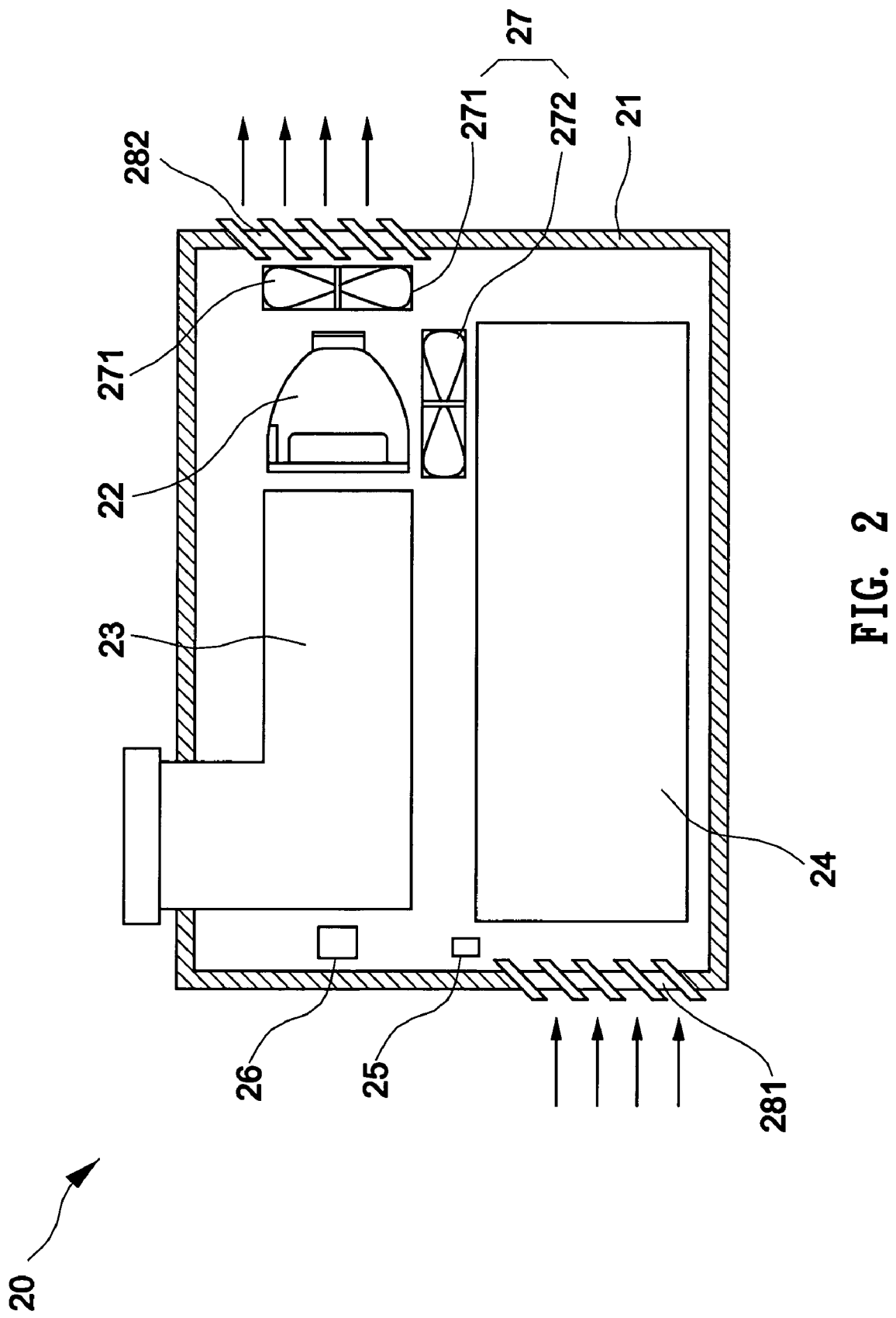
FIG. 2 is a perspective diagram showing a projection display in the present invention.

Please refer to FIG. 2. The projection display 20 mainly includes a case 21, and a lamp 22, an optical engine 23, a control unit 24, a pressure sensor 25, a control unit 26 and a cooling unit 27 are disposed inside the case 21, an intake 281 and a outtake 282 disposed respectively on the two lateral sides of the case 21. The pressure sensor 25 is such as the ATP 015 series produced by the company "apm", and is made of a piezoelectric material and processed by MEMS (Microelectromechanical System). The inside of the pressure sensor 25 is vacuum and the pressure sensor 25 senses the difference in atmospheric pressures of different elevations above sea level for outputting a corresponding tiny voltage. The pressure sensor 25 is disposed near the intake 281 and connected with the control unit 26 for detecting the pressure outside the projection display 20 and outputting a signal to the control unit 26, wherein the signal varies with the pressure outside the projection display 20. The control unit 26 is disposed inside the projection display 20 and connected with the pressure sensor 25 and the cooling unit 27 respectively for receiving the signal transmitted from the pressure sensor 25 and simultaneously controlling the cooling unit 27. The control unit 26 controls the rotating speed of the cooling unit 27 according to different signals. The cooling unit 27 can be a set of fan 271 and fan 272 that can change the rotating speed in a stepless way by changing the voltage of the fan 271 and the fan 272, or can be set to a plurality of cooling modes with constant rotating speed (the first cooling mode, the second cooling mode, the third cooling mode or the fourth cooling mode).

Figure 3:
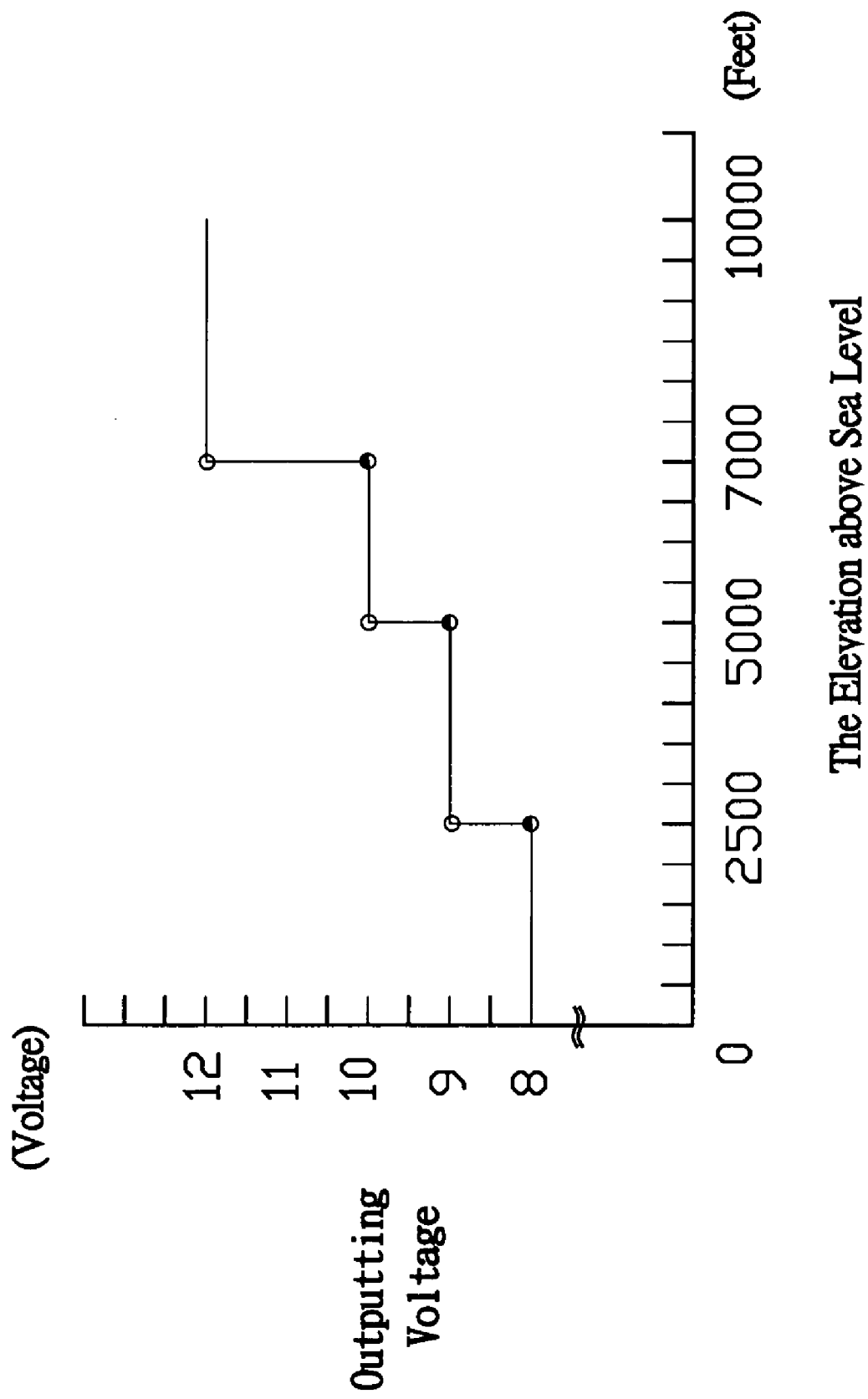
FIG. 3 is a diagram showing the relation between the outputting voltage of the fans and the elevation above sea level of the projection display in the present invention.

Please refer to FIG. 3. According to the effect on cooling efficiency at each elevation above sea level, the set of fan 271 and fan 272 is set to be in the first cooling mode, the second cooling mode, the third cooling mode and the fourth cooling mode. When the elevation above sea level of the projection display 20 is 0 feet, the atmospheric pressure is 760 mm-Hg and the density of the air is 0.0765 (lb/ft$^3$). When the elevation above sea level of the projection display 20 is 2500 feet, the atmospheric pressure is 694 mm-Hg and the density of the air is 0.07105 (lb/ft$^3$), and the cooling efficiency is 92.8% of that at 0 feet. For maintaining constant cooling efficiency of the projection display 20, when the elevation above sea level of the projection display 20 is 0~2500 feet, the set of fan 271 and fan 272 outputs a outputting voltage of 8 voltage for making the rotating speed 1.0767 times of that at 0 feet, and this is the first cooling mode. Similarly, when the elevation above sea level of the projection display 20 is 2501~5000 feet, the set of fan 271 and fan 272 outputs a outputting voltage of 9 voltage for making the rotating speed 1.1608 times of that at 0 feet, and this is the second cooling mode. When the elevation above sea level of the projection display 20 is 7000 feet, the atmospheric pressure is 586 mm-Hg and the density of the air is 0.062 (lb/ft$^3$), and the cooling efficiency is 81% of that at 0 feet. For maintaining constant cooling efficiency of the projection display 20, when the elevation above sea level of the projection display 20 is 5001~7000 feet, the set of fan 271 and fan 272 outputs a outputting voltage of 10 voltage for making the rotating speed 1.2338 times of that at 0 feet, and this is the third cooling mode. When the elevation above sea level of the projection display 20 is 10000 feet, the atmospheric pressure is 532 mm-Hg and the density of the air is 0.0565 (lb/ft$^3$), and the cooling efficiency is 73.8% of that at 0 feet. For maintaining constant cooling efficiency of the projection display 20, when the elevation above sea level of the projection display 20 is 7001~10000 feet, the set of fan 271 and fan 272 outputs a outputting voltage of 12 voltage for making the rotating speed 1.3539 times of that at 0 feet, and this is the fourth cooling mode. Thereby, the relationship between the elevation above sea level and the cooling efficiency is used to set the voltage of the fans, and the set of fan 271 and 272 can provide the best cooling efficiency for the projection display 20, besides, a plurality of cooling modes is set to maintain a constant voltage in an elevation region above sea level for simplifying the control of fans.

Figure 4:
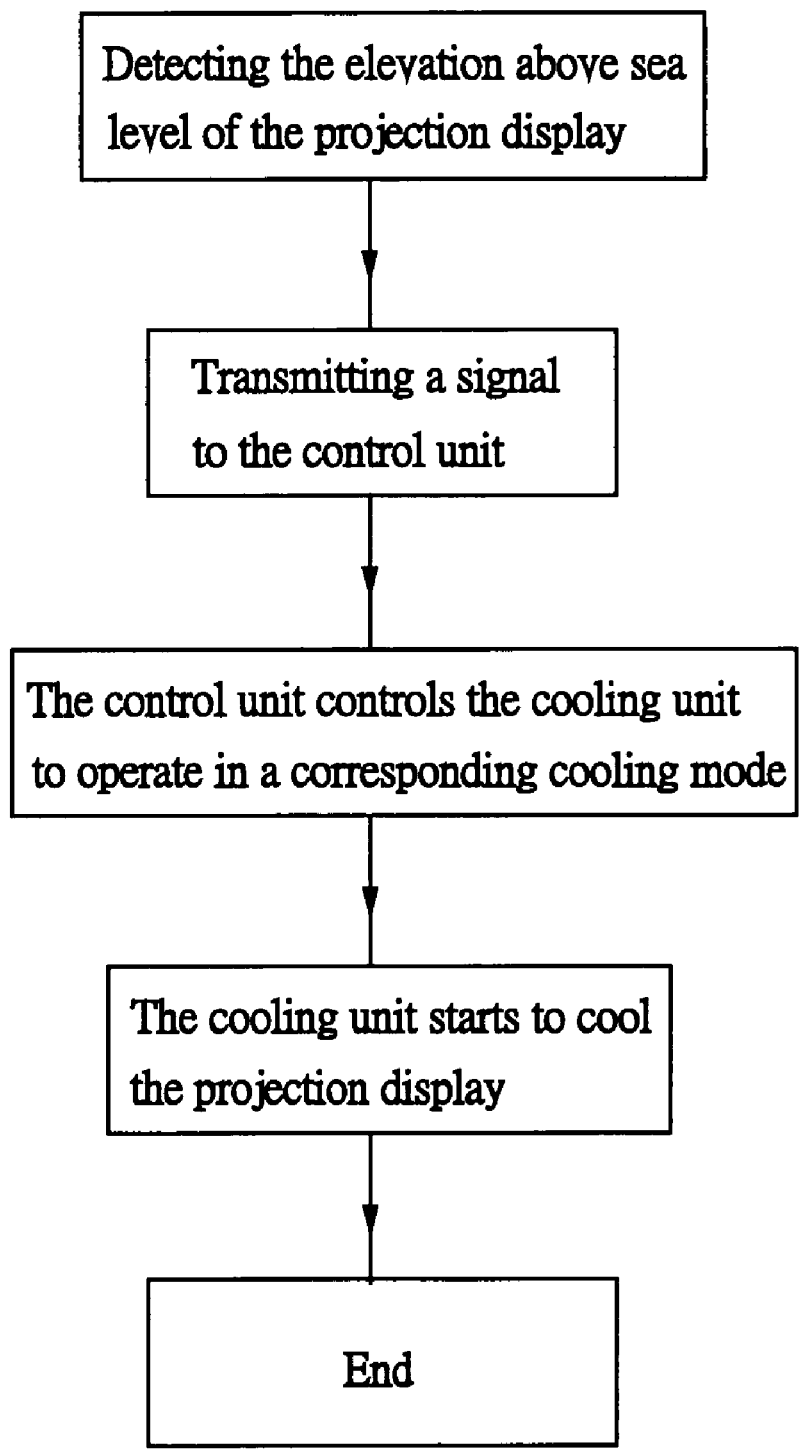
FIG. 4 is a flow chart showing the control method for cooling the projection display in the present invention.

Please refer to FIG. 4. The control method for cooling the projection display 20 is at first detecting the atmospheric pressure of the projection display 20 by the pressure sensor 25 for obtaining the elevation above sea level thereof, and then outputting a signal corresponding to the elevation above sea level to the control unit 26, and thereafter the control unit 26 controls the cooling unit 27 to operate at different rotating speeds according to the signal received, so that the cooling unit 27 starts to cool the projection display 20 effectively. The pressure sensor 25 can automatically detect the pressure changes (that is, changes of the elevation above sea level) and control the cooling unit 27 to operate in different cooling modes (or rotating speeds) so that the cooling unit 27 can provide enough airflow for cooling the projection display 20. Thus, the projection display 20 can obtain the best cooling efficiency in different environments and operate normally, and the rotating speed of the cooling unit 27 is adjusted simultaneously for extending the lifetime of the cooling unit 27 and preventing noise.

While this invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A control method for cooling a projection display, the projection display having a pressure sensor connected to a control unit, the control unit being connected to at least one cooling units, the control method comprising the steps of:
   the pressure sensor detecting the elevation above sea level of the projection display;
   the pressure sensor transmitting a signal to the control unit; and
   the control unit controlling the cooling unit to increase cooling as the elevation above sea level increases.

2. The control method for cooling a projection display according to claim 1, wherein the cooling unit has a plurality of cooling modes.

3. The control method for cooling a projection display according to claim 1, wherein the cooling unit has at least one set of fans and the speed of the fans is adjusted in a stepless way according to the change of the elevation above sea level.

4. The control method for cooling a projection display according to claim 1, wherein the pressure sensor transmits a corresponding signal to the control unit by detecting the change of the elevation above sea level.

* * * * *